United States Patent [19]

Razzacki et al.

[11] Patent Number: 4,776,228
[45] Date of Patent: Oct. 11, 1988

[54] STRUTLESS SYNCHRONIZER

[75] Inventors: Syed T. Razzacki, Troy; Gerald L. Holbrook, Rochester, both of Mich.

[73] Assignee: Chrysler Motors Corporation, Highland Park, Mich.

[21] Appl. No.: 141,437

[22] Filed: Jan. 7, 1988

Related U.S. Application Data

[63] Continuation of Ser. No. 882,649, Jul. 7, 1986, abandoned.

[51] Int. Cl.$^4$ .............................................. F16H 3/38
[52] U.S. Cl. ..................................... 74/339; 192/53 F
[58] Field of Search ............. 74/339; 192/53 F, 53 A, 192/53 G, 53 E

[56] References Cited

U.S. PATENT DOCUMENTS

| | | | |
|---|---|---|---|
| 2,200,851 | 5/1940 | Osborne | 192/53 F |
| 2,470,208 | 5/1949 | Avila | 192/53 F |
| 2,571,474 | 10/1951 | Ochs et al. | 192/53 F |
| 3,035,674 | 5/1962 | Peras | 192/53 F |
| 3,700,083 | 10/1972 | Ashikawa et al. | 192/53 F |
| 3,795,293 | 3/1974 | Worner | 192/53 F |
| 4,027,756 | 6/1977 | Wolfe | 192/53 F X |
| 4,376,475 | 3/1983 | Janiszewski | 192/53 F |
| 4,625,844 | 12/1986 | Ikemoto | 192/53 F |

FOREIGN PATENT DOCUMENTS

| | | | |
|---|---|---|---|
| 2390633 | 1/1979 | France | 192/53 F |
| 2089912 | 6/1982 | United Kingdom | 192/53 A |

OTHER PUBLICATIONS

Society of Automotive Engineers Report No. 680008, "Manual Transmission Synchronizer", Socin and Walters, Jan. 1968.

Primary Examiner—Leslie A. Braun
Assistant Examiner—David Novais
Attorney, Agent, or Firm—Edward P. Barthel

[57] ABSTRACT

An improved strutless synchronizer has an annular spring interposed between an internally splined sleeve, mounted for axial sliding movement on a main shaft, and an associated blocking ring. Selected ones of the sleeve splines are formed at the extremities with radially inwardly extending teeth. Each of the teeth has a dual chamfered face portion in opposed relation with the annular spring. The blocking ring has three equally spaced lugs each formed with a transverse groove sized to axially capture the annular spring so as to allow the spring freedom to rotate in its grooves relative to the blocking ring. Each time the sleeve is moved toward meshed engagement with an associated main shaft ratio gear its spline teeth chamfered faces compress the spring at random points thereby minimizing spring wear. Also, the grooves, by positively retaining the spring, insure instant unloading of the blocking ring.

1 Claim, 3 Drawing Sheets

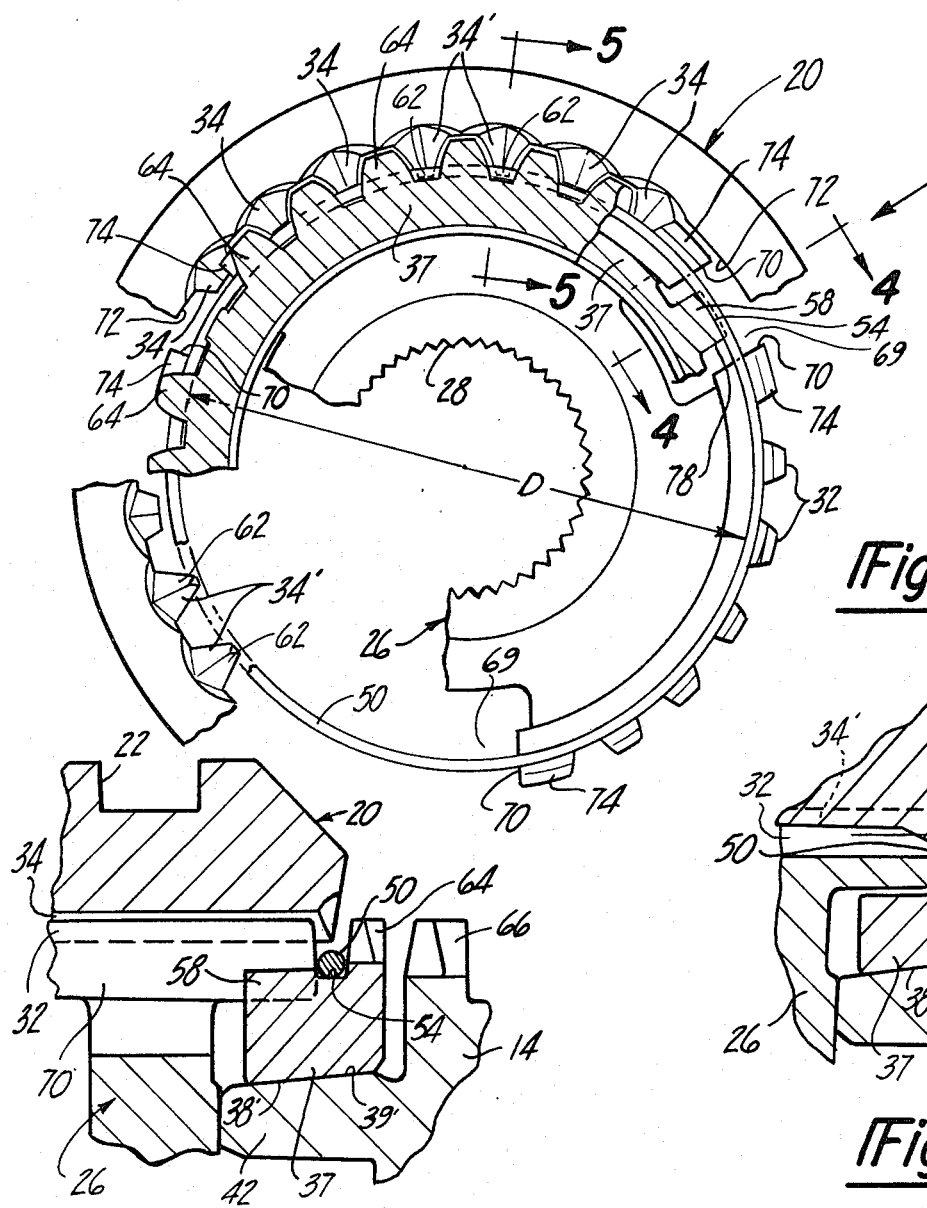
*Fig-3*
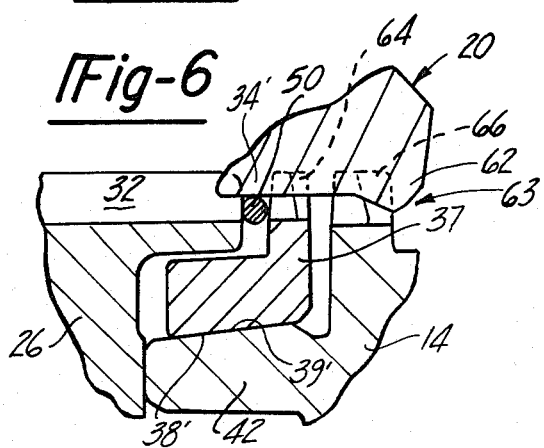
*Fig-4*
*Fig-5*
*Fig-6*
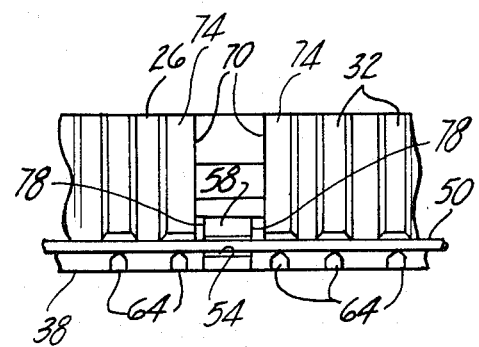
*Fig-7*

STRUTLESS SYNCHRONIZER

This is a continuation of U.S. patent application Ser. No. 06/882,649, filed July 7, 1986 now abandoned.

BACKGROUND OF THE INVENTION

This invention relates to strutless synchronizers for manual transmissions and more particularly to an improved blocking ring strutless synchronizer incorporating resilient torque generating annular springs.

Strutless synchronizers, such as disclosed in the U.S. Pat. No. 3,700,083 issued Oct. 29, 1972 to N. Ashikawa et al. are well known in the synchromesh transmission art. The '083 patent employs a D-section annular spring interposed between a sleeve, slidably mounted on a hub spline of a main shaft, and a blocking ring provided on the conical slidable surface of a speed ratio gear. The annular spring is slidably mounted in a snug manner on the outer surface of three uniformly spaced axially extending lugs integrally formed as the blocking ring. The annular spring interposed between the sleeve and the blocking ring lugs is so arranged that upon movement of the sleeve, the annular spring is first pushed axially by certain of the sleeve internal uniformly spaced splines. This in turn causes the annular spring to axially push the blocking ring. The blocking ring is then seated on the gear cone which, having a relative rotational speed, generates a cone torque to index or clock the blocking ring to the desired blocking position. Once synchronization is complete, the annular spring is then compressed and deflected radially inward by the sleeve as the sleeve passes over the spring. As a result, the sleeve internal splines mesh with a driven gear journaled on the main shaft and thus rotation of the main shaft is transmitted to the driven gear.

SUMMARY OF THE INVENTION

It is, therefore, a primary object of the present invention to provide an improved strutless synchronizer employing an annular spring captured in three axially spaced grooved lugs formed on the blocker ring. The annular spring is of a predetermined uniform circular cross-section greater than the depth of the grooves. Also, the annular spring has a predetermined inner diameter slightly greater than the diameter defined by the base of the grooves. The unique relationship of the annular spring and the lug grooves allows the annular spring to undergo slight rotational travel relative to the blocker ring. The annular spring rotational travel results each time it is contacted by inclined surfaces of radial teeth on at least three equally spaced sleeve internal splines while the sleeve is moved axially. This construction greatly extends the service life of the annular spring as a result of the continuously changing contact area between the sleeve chamfered radial teeth as they compress and radially inwardly deflect the annular spring. The grooved lugs also restrict the annular spring from axial movement on the blocker ring, thereby insuring instant release of the frictional forces between the blocking ring and drive gear sliding conical surfaces and consequent unloading of the blocking ring.

A further object of the present invention is to maintain the break-through load from the time the sleeve splines gage point contacts the annular spring to the time it contacts with the pitch point of the ring teeth. This is accomplished by providing a dual chamfer or ramp on at least equally spaced sleeve internal splines. A first steep ramp initially contacts the annular spring and loads the annular spring which in turn loads the blocking ring. This load rotates the lugs on the blocking ring into engagement with their associated hub notches. At this point the running clearance between all the axially moving parts has been taken up, and the chamfer of the synchronizer sleeve and blocking ring splines are indexed into axial alignment. The sleeve will continue to radially compress the annular spring inwardly thereby generating a break-through load that insures proper blocking action by the blocking ring. A second reduced ramp provided on the spline teeth is operative to extend the time interval during which the break-through load is generated. This extended time interval insures that the pitch points on the sleeve splines and the blocking ring teeth are brought into contact prior to the release of the break-through load.

Reference may be had to the Society of Automotive Engineers Report No. 680008 published January, 1968, titled "Manual Transmission Synchronizer" by Richard J. Socin and L. Kirk Walters. This report, adopted by reference herein, provides a detailed discussion of general design requirements affecting synchronizer performance together with definitions of terms relative to the art.

Further objects and advantages of the present invention will be apparent from the following description, reference being made to the accompanying drawings wherein a preferred embodiment of the present invention is clearly shown.

BRIEF DESCRIPTION OF THE DRAWINGS

FIG. 1A is an enlarged fragmentary view of a portion of FIG. 1 within circle designated 1A;

FIG. 3 is an enlarged fragmentary cross-sectional view, with parts broken away, taken substantially on the line 3—3 of FIG. 1;

FIG. 4 is a fragmentary cross-sectional view taken on the line 4—4 of FIG. 3;

FIG. 5 is a fragmentary cross-sectional view taken on the line 5—5 of FIG. 3;

FIG. 6 is a fragmentary cross-sectional view similar to FIG. 5 showing the sleeve moved to the right engaging the blocking ring and the right hand ratio gear;

FIG. 7 is a fragmentary elevational view taken in the direction of arrow 7 of FIG. 3 with the outer sleeve removed; and FIG. 8 is an enlarged fragmentary cross-sectional view of one of the left blocking ring grooved lug and its annular spring.

DETAILED DESCRIPTION OF THE PREFERRED EMBODIMENT

Figure 1:
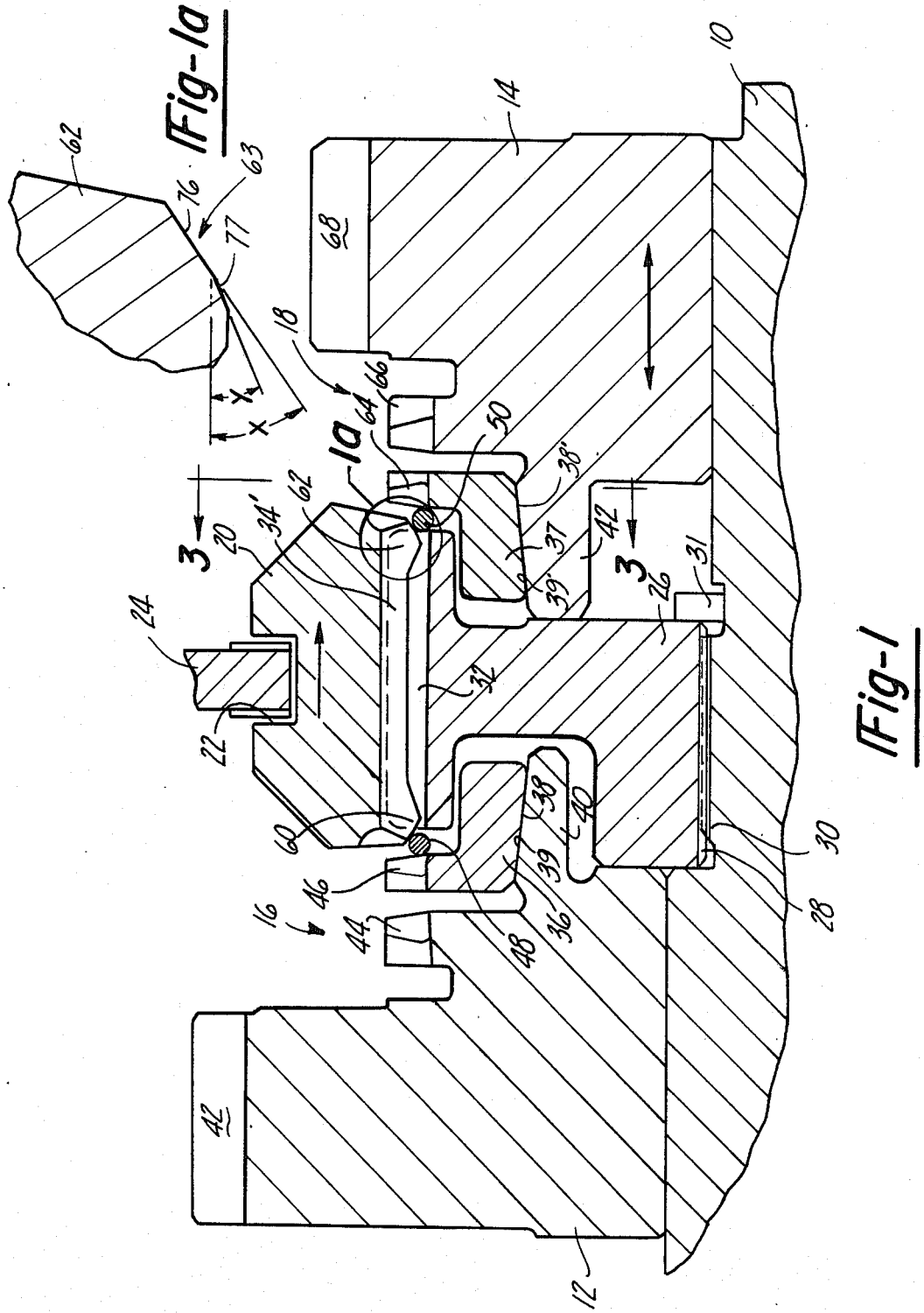
FIG. 1 is an axial longitudinal cross-sectional view of the synchronizing mechanism according to this invention.
Figure 2:
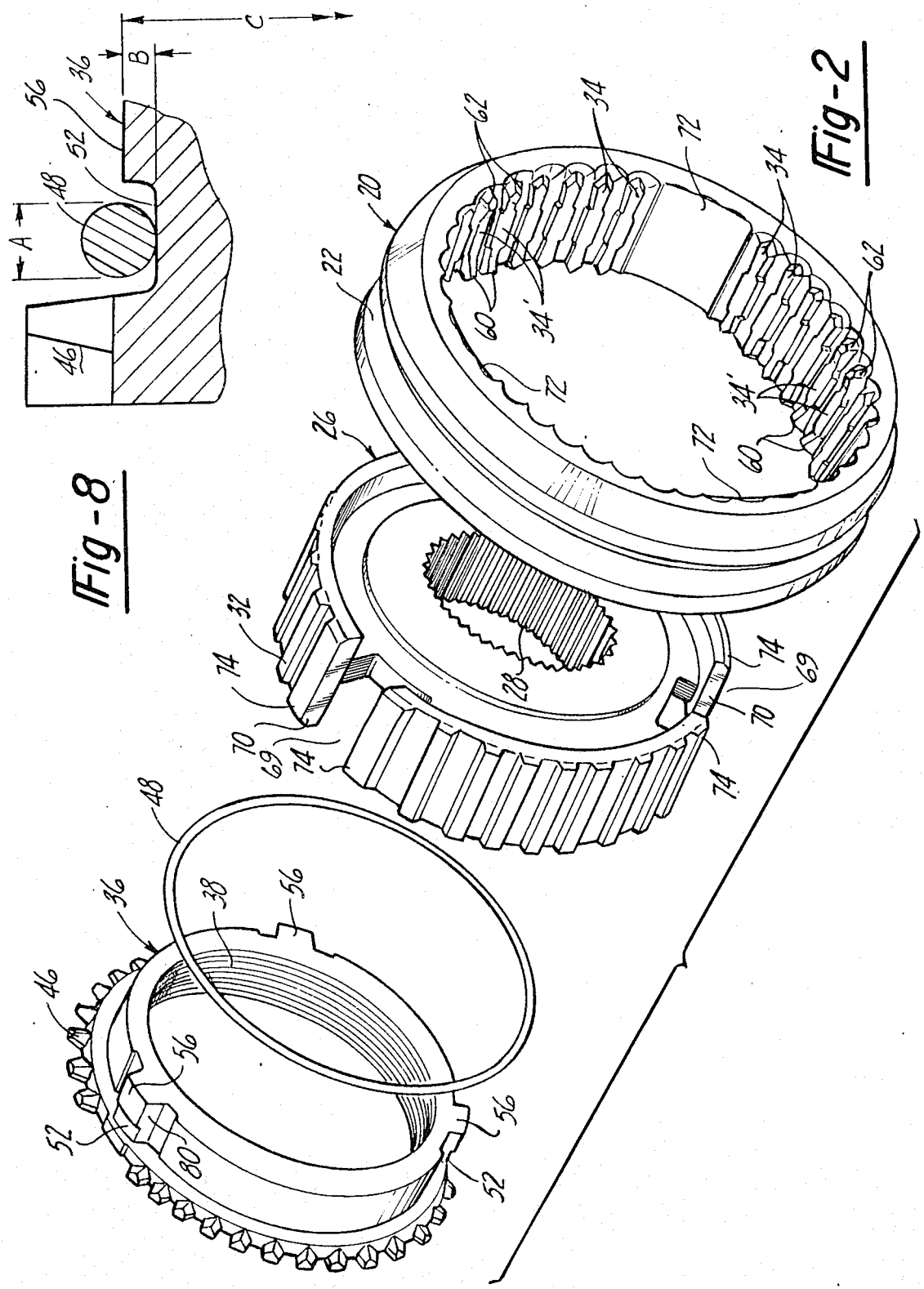
FIG. 2 is an enlarged exploded perspective view of a portion of the synchronizer mechanism shown in FIG. 1.

Referring now to the drawings there is seen in FIG. 1 a transmission shaft 10, on which are rotatably supported a pair of ratio gears 12 and 14. Disposed between the ratio gears 12 and 14 is a pair of left and right synchronizer assemblies 16 and 18 which are operable to cause selective speed synchronization between shaft 10 and ratio gears 12 and 14, respectively. The synchronizer assemblies 16 and 18 are operated through a shift sleeve 20 which is connected by a yoke groove 22 to a conventional mechanical shift fork mechanism partially shown at 24. FIG. 2 of the drawings shows the synchronizer assembly 16 in an exploded perspective view. As the synchronizer assembly 18 is substantially identical with the synchronizer assembly 16, like or similar parts will operate in a similar manner except for their direction of travel. The synchronizer assemblies include a common hub 26 fixedly connected to the main shaft 10 through internal splines 28 engaging external splines 30 on the main shaft as seen in FIG. 1. The snap ring 31 positions the hub 26 axially on the shaft 10. The sleeve 20 is mounted on the hub 26 by means of hub external splines or splined surface 32 engaging sleeve internal splines or splined surface 34. Thus, the sleeve 20 is axially slidable on the hub 26 by means of the shift fork mechanism 24. It will be noted that the ratio gears 12 and 14 are journaled on the shaft 10 for rotation relative thereto.

The synchronizer assemblies 16, 18 each includes a respective blocking or clutch ring 36 and 37 having inner conical surfaces 38 and 38' which slide on associated outer peripheral conical surfaces 39 and 39' formed on gear cone portions 40 and 42, respectively. The ratio gear 12 has a toothed outer diameter or surface 42 adapted to mesh with other gear members in a well known manner. An inner clutch toothed surface 44 on gear 12 is coaxial and alignable with a splined toothed surface 46 formed on the outer circumference of synchronizer blocking ring 36. Both toothed surfaces 44 and 46 are engageable by the internal splined surface 34 of the shift sleeve 20. It will be noted that the splined surface 34 is in continual engagement with the hub exterior splined surface 32.

Circular resilient left and right annular springs 48 and 50 are mounted on their associated blocking rings 36 and 37, respectively. The annular springs 48 and 50 are each retained in a snap-action manner in three identical circumferential left and right sets of grooves 52 and 54, respectively, formed in radially extending sets of lugs 56 and 58 equally spaced at 120 degree intervals around their associated blocking rings 36 and 37. As best seen in FIG. 8, the left set of grooves 52 in lugs 56 have a predetermined depth so as to axially capture three equally spaced portions of the right annular spring 50 in a snap-action manner. The right set of grooves 54 capture the annular spring 50 in an identical manner.

It will be seen in FIG. 8 that the circular-cross section of the annular spring is formed with a diameter "A" which in the disclosed embodiment has a diameter of about 1.50 mm while the groove 52 has a depth "B" of about 0.75 mm. That is, the annular spring diameter is at least twice the depth of the groove 52. Further, the diameter "C" defined by the lugs outer surfaces is about 83.50 mm while the internal diameter "D" (FIG. 3) of the annular spring 50 is about 84.70 mm. Thus, the annular springs 48 and 50 are axially retained or captured by their associated sets of grooves 52 and 54. Because of the clearance provided by the grooves, however, the annular springs are free to travel about the axis of the shaft 10 relative to their associated blocking ring. Thus, the annular spring will be contacted at random locations by certain sleeve internal spine radial teeth portions to be described.

With reference to FIG. 1 the sleeve 20 is shown located in its neutral or axially centered position relative to hub 26 by means of the two annular springs 48 and 50. The annular springs 48 and 50 have their inner surfaces in light contact with their associated left and right longer projecting or radial teeth portions 60 and 62, respectively, on the inner surface at each end of the spline. In a manner identical to the synchronizer assembly 16, the synchronizer assembly 18 has its right blocking ring 37 formed with a toothed surface defined by external teeth 64. Also, the ratio gear 14 has an inner toothed surface or teeth 66 coaxial and alignable with toothed surface 64. The ratio gear 14 also has a toothed outer surface 68 adapted to mesh with other gear members.

As shown and described in the above mentioned U.S. Pat. No. 3,700,083, the projections or radial teeth portions 60 and 62 are formed at each axial end of three pair of uniformly spaced sleeve internal splines 34. With reference to FIGS. 2 and 3 there is provided three pair of the 120 degree spaced splines 34' each formed with radial teeth portions 60 and 62 at their left and right ends, respectively. It will be noted that in FIG. 3 a reduced number of splines 34 and blocking ring teeth 46 are shown in this enlarged view for purposes of clarity. FIG. 2 shows a preferred embodiment of applicant's invention with an increased number of splines 34 and teeth 46 depicted.

As seen in FIG. 2, the hub external splines 32 are interrupted at three uniformly spaced locations by notches 69 axially centered to receive associated blocking ring lugs 56 therein. FIG. 7 of the drawings shows a right lug 58 nested within its associated notch 69 defined by opposed radially extending surfaces 70. FIG. 2 also shows the sleeve having its internal splines 34 interrupted at three uniform spline locations 72 for reception of an associated pair of wide splines 74 defining each notch 69.

With reference to FIG. 1a it will be noted that each radial tooth 62 has a compound beveled ramp 63 comprising a first steep angle ramp portion 76 and a second reduced angle ramp portion 77. The purpose of such compound or double chamfered face 63 will be explained below. Further, it will be observed that during indexing or clocking of the blocking rings their associated lugs 56 and 58 have their respective side faces 78 and 80 adapted to contact an associated notch face 70.

In operation upon the sleeve 20 being shifted to the right from its neutral position of FIG. 1, each pair of radial teeth portions 62 initial steep angle ramp portions, shown at 76 in FIG. 1A, contacts the annular spring 50. At this point the running clearance between all the axially moving parts has been taken up. Next a detent load builds up as the annular spring 50 is compressed radially by the sleeve teeth 62 before the pitch points of the sleeve splines 34' and ring teeth 64 come into initial contact. It will be noted that the pitch points are located on the pitch diameter indicated by the construction line 79 in FIG. 5. Thus, for example, the pitch points for the teeth 66 is indicated at "E", the pitch point for the teeth 64 is indicated at "F", and the pitch point for the spline 34' radial teeth portions 62 is indicated at "G".

The initial steep ramp portions 76 also radially compress the annular spring 50 generating the cone torque on the right blocking ring 37. This cone torque results from a metal-to-metal frictional contact developed at the interface of the ring and gear cone surfaces 38' and 39', respectively. This cone torque or break-through load insures proper blocking action between the chamfers on the sleeve internal spline teeth 62 and the blocking ring teeth 64.

As the sleeve 20 continues to be shifted to the right a second reduced angle ramp portion 77 (FIG. 1A)

contacts and continues to inwardly compress the annular spring 50. The second reduced ramp portion 77 extends the time duration of the generation of the break-through load. This extended break-through load time interval insures proper blocking action prior to the unloading of the annular spring to its position shown in FIG. 6.

The sequence of synchronizer events from neutral to full engagement may be summarized by the following six steps:

1. The sleeve moves from neutral to its detent position wherein the six radial teeth 62 contact the annular spring.
2. The detent load builds-up on the annular spring.
3. The blocker ring rotates or clocks to index its teeth with the sleeve spline teeth 62.
4. The blocker ring is energized by the sleeve teeth chamfers contacting the ring teeth chamfers.
5. The blocker ring and annular spring are unloaded and the sleeve passes through.
6. The ratio gear teeth 66 move aside to pass the sleeve splines and complete the synchronizer lockup.

It will be noted on FIG. 1A that the initial steep ramp portion 76 defines an angle X with the horizontal while the reduced ramp portion defines an angle Y with the horizontal. In the disclosed embodiment the angle X is about 35 degrees from the horizontal while the reduced ramp angle Y is about 25 degrees from the horizontal.

Although only one embodiment of the invention has been illustrated and described, it is apparent that modifications and variations will readily come to mind of a person skilled in the art which modifications and variations do not fall outside the scope of the invention as defined by the following claims.

WHAT IS CLAIMED IS:

1. In a gear synchronizer assembly for a synchromesh transmission, said assembly comprising at least one ratio gear loosely mounted on a shaft of the transmission and concentric with the principal axis of said shaft, said ratio gear formed with an external conical surface, an externally splined hub fixed on said shaft and a sleeve having internal splines slidably coupled to said hub external splines and slidable thereon by fork means from a neutral position to an outboard operative position for engaging the ratio gear to couple the ratio gear in rotation with said shaft, a blocking ring having outboard and inboard directed faces and an internal conical surface disposed for controlled sliding abutment with said ratio gear external conical surfaces, said blocking ring having an outer cylindrical surface formed with a radially extending splined tooth surface at said outboard face, an annular continuous compression spring between said sleeve and said blocking ring to press said blocking ring internal conical surface against said ratio gear external conical surface and couple the same in rotation when said sleeve is initially displaced outboard toward said operative position, said compression spring being deformed as the sleeve advances further to said operative position to permit said sleeve to advance therepast and engage the now rotating ratio gear, and an inwardly extending radial tooth at one end of at least three equally spaced sleeve internal splines, each said equally spaced radial tooth having a longitudinally extending angled end surface ramp, each said radial tooth end surface ramp facing said blocking ring and positioned to contact and inwardly deform said spring and pass thereover as said sleeve is advanced in an outboard direction to engage said ratio drive gear, the improvement in said gear synchronizer assembly wherein: three equally spaced axially extending raised lugs are integrally formed on said blocking ring outer cylindrical surface at said inboard face, said lugs arranged such that each said lug is located midway between adjacent ones of said equally spaced toothed splines, each said lug having a transversely extending discontinuous groove portion formed therein adjacent the inboard end of said splined tooth surface, each said groove portion having a predetermined depth and formed with a base portion defining an arcuate section of a concentrical imaginary circle of predetermined diameter, said continuous annular compression spring having a uniform circular cross section with a predetermined cross sectional diameter about twice said groove depth, said three groove portions sized to axially capture said spring therein in a snap-action manner adjacent said blocking ring toothed surface inboard end upon said spring sliding over said lugs in a snug fit fashion, said spring having a predetermined internal diameter slightly larger than the diameter of said imaginary circle enabling said spring to freely rotate relative to said blocking ring, such that each time said sleeve is advanced in said outboard direction from said neutral position each said radial tooth angled end surface ramp contacts said spring at randomly occurring locations thereby obviating fixed wear areas on said spring so as to extend its useful service life, and whereby said groove portions trap said spring against axial travel with said sleeve upon said fork means initiating said sleeve inboard return travel toward said neutral position thereby minimizing the time required to unload said blocking ring and ratio gear conical surfaces, and wherein each said radial tooth end surface angled ramp is in the form of a first inboard steep angled ramp portion sloped at an angle of about 35 degrees from the horizontal and a second outboard reduced angled ramp portion sloped at an angle of about 25 degrees from the horizontal, whereby upon said sleeve being advanced in said outboard direction said spring is contacted initially by said first ramp portion thereby placing an initial high axial load on said spring, and whereby as said sleeve is further advanced outboard towards said ratio gear said second reduced angled ramp portion contacts said spring thereby extending the time interval during which each said sleeve radial tooth first and second ramp portions transfer a fork means load compressing said spring so as to generate an extended break-through load insuring proper synchronization between said sleeve internal spline chamfers and said blocking ring external teeth chamfers prior to the release of said break-through load.

* * * * *